United States Patent
Kwon

(10) Patent No.: US 12,496,873 B2
(45) Date of Patent: Dec. 16, 2025

(54) APPARATUS FOR CONTROLLING AIR CONDITIONING OF AN ELECTRIC VEHICLE AND METHOD THEREOF

(71) Applicants: Hyundai Motor Company, Seoul (KR); Kia Corporation, Seoul (KR)

(72) Inventor: Gi Young Kwon, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 213 days.

(21) Appl. No.: 17/978,815

(22) Filed: Nov. 1, 2022

(65) Prior Publication Data

US 2023/0406064 A1 Dec. 21, 2023

(30) Foreign Application Priority Data

Jun. 21, 2022 (KR) .................... 10-2022-0075697

(51) Int. Cl.
  *B60H 1/00* (2006.01)
  *H01M 10/613* (2014.01)
  (Continued)

(52) U.S. Cl.
  CPC ..... *B60H 1/00849* (2013.01); *B60H 1/00278* (2013.01); *B60H 1/00385* (2013.01); *H01M 10/613* (2015.04); *H01M 10/615* (2015.04); *H01M 10/625* (2015.04); *H01M 10/635* (2015.04); *H01M 10/6561* (2015.04); *H01M 10/663* (2015.04); *B60H 2001/003* (2013.01);
  (Continued)

(58) Field of Classification Search
  CPC .. B60H 1/00; B60H 1/00835; B60H 1/00278; H01M 10/663; H01M 10/486; H01M 10/433; H01M 2220/20; B60K 1/04; B60L 53/80
  See application file for complete search history.

(56) References Cited

U.S. PATENT DOCUMENTS 6,484,755 B1 11/2002 Schwarz
9,067,486 B2 * 6/2015 Janarthanam ....... H01M 50/249
(Continued)

FOREIGN PATENT DOCUMENTS

CN 102223018 B * 12/2012 ............... H02J 9/04
CN 105774465 A * 7/2016 ............... B60H 1/00
(Continued)

OTHER PUBLICATIONS

An English-translated version for reference Hagino M (JP-3588865-B2) assignee: Nissan Motor Co Ltd (Year: 2004).*
(Continued)

*Primary Examiner* — Cuong H Nguyen
(74) *Attorney, Agent, or Firm* — Morgan Lewis & Bockius LLP

(57) ABSTRACT

An air conditioning control apparatus and method for an electrified vehicle includes a processor configured to automatically switch to an outdoor mode when a replacement battery is mounted in a state in which the air conditioning control apparatus is deactivated and then to determine an operation mode of a blend door depending on an indoor temperature and a preset temperature in the vehicle; and a storage connected to the processor and configured to store data and algorithms driven by the processor.

19 Claims, 7 Drawing Sheets

(51) Int. Cl.
  *H01M 10/615* (2014.01)
  *H01M 10/625* (2014.01)
  *H01M 10/635* (2014.01)
  *H01M 10/6561* (2014.01)
  *H01M 10/663* (2014.01)
  *B60L 53/80* (2019.01)
  *B60L 58/24* (2019.01)

(52) U.S. Cl.
  CPC .............. *B60L 53/80* (2019.02); *B60L 58/24* (2019.02); *H01M 2220/20* (2013.01)

(56) References Cited

U.S. PATENT DOCUMENTS

| | | | | |
|---|---|---|---|---|
| 10,644,367 | B2* | 5/2020 | Jalilevand | H01M 10/633 |
| 10,654,338 | B2* | 5/2020 | Sokolofsky | B60H 1/00678 |
| 11,511,595 | B2* | 11/2022 | Bray | B60H 1/32281 |
| 11,628,704 | B2* | 4/2023 | Bray | B60H 1/00885 |
| | | | | 454/69 |
| 11,660,930 | B2* | 5/2023 | Brown | B60H 1/00857 |
| | | | | 454/143 |
| 11,728,537 | B2* | 8/2023 | Shrivastava | H01M 10/6561 |
| | | | | 429/120 |
| 11,890,914 | B2* | 2/2024 | Mazaira | B60L 58/27 |
| 11,890,956 | B2* | 2/2024 | Ding | B60L 50/60 |
| 2014/0216684 | A1* | 8/2014 | Goenka | B60H 1/00499 |
| | | | | 165/59 |
| 2014/0216705 | A1* | 8/2014 | Dage | B60H 1/00771 |
| | | | | 62/176.2 |
| 2018/0097266 | A1* | 4/2018 | Jalilevand | H01M 10/613 |
| 2019/0152290 | A1* | 5/2019 | Sokolofsky | B60H 1/00857 |
| 2020/0072178 | A1* | 3/2020 | Berkson | B60W 10/26 |
| 2021/0242518 | A1* | 8/2021 | Shrivastava | H01M 10/663 |
| 2021/0283978 | A1* | 9/2021 | Bray | B60H 1/3205 |
| 2021/0283979 | A1* | 9/2021 | Bray | B60H 1/32281 |
| 2022/0258565 | A1* | 8/2022 | Skapof | B60H 1/3414 |
| 2023/0074313 | A1* | 3/2023 | Mazaira | H01M 10/613 |
| 2024/0067510 | A1* | 2/2024 | Ulbrich | B66F 9/063 |

FOREIGN PATENT DOCUMENTS

| | | | | |
|---|---|---|---|---|
| CN | 109795282 | A | 5/2019 | |
| CN | 113352840 | A * | 9/2021 | .............. B60H 1/00 |
| DE | 102005031320 | A1 * | 2/2006 | ......... B60H 1/00278 |
| DE | 102018118685 | A1 * | 2/2019 | ......... B60H 1/00764 |
| JP | H08-40088 | A | 2/1996 | |
| JP | 3588865 | B2 * | 11/2004 | |
| JP | 2006-056357 | A | 3/2006 | |
| KR | 10-2011-0032081 | A | 3/2011 | |
| KR | 20130116344 | A * | 10/2013 | ............ H01M 10/63 |
| KR | 10-1438094 | B | 9/2014 | |
| KR | 10-1654749 | B | 9/2016 | |
| KR | 2022022760 | A * | 2/2022 | |

OTHER PUBLICATIONS

Choi, Wansik, et al. "Reinforcement Learning-based Controller for Thermal Management System of Electric Vehicles." 2022 IEEE Vehicle Power and Propulsion Conference (VPPC). IEEE, 2022. (Year: 2022).*
Landau, B.A., 2000. Developing the requirements for an assembly advisor (Doctoral dissertation, Massachusetts Institute of Technology). (Year: 2000).*
An English-translated version of Taniyama Koichi et al (KR 20130116344 A) (Year: 2012).*
An English-translated version of Maguire P et al (DE-102005031320-A1) (Year: 2012).*
Zhao, Chen, et al. "Research on electric vehicle range under cold condition." Advances in Mechanical Engineering 14.3 (2022): 16878132221087083. (Year: 2022).*
Alam, Md Absar, et al. "Recent developments trends in HVAC (heating, ventilation, and air-conditioning) systems: A comprehensive review." Materials today: proceedings (2023). (Year: 2023).*
Yang, Dongxu, et al. "Data-driven analysis of battery electric vehicle energy consumption under real-world temperature conditions." Journal of energy storage 72 (2023): 108590. (Year: 2023).*
Wray, Alex, and Kambiz Ebrahimi. "Octovalve thermal management control for electric vehicle." Energies 15.17 (2022): 6118. (Year : 2022).*

* cited by examiner

| Position of ventilation hole for each vehicle type | Behind headrest in rear row (301) | Next to rear seat (302) | Under rear seat (303) |

FIG.3

APPARATUS FOR CONTROLLING AIR CONDITIONING OF AN ELECTRIC VEHICLE AND METHOD THEREOF

CROSS-REFERENCE TO RELATED APPLICATION

The present application claims priority to Korean Patent Application No. 10-2022-0075697, filed on Jun. 21, 2022, the entire contents of which is incorporated herein for all purposes by this reference.

BACKGROUND OF THE PRESENT DISCLOSURE

Field of the Present Disclosure

The present disclosure relates to an air conditioning control apparatus and method for an electrified vehicle, and more particularly, to a technique for automatically controlling a blend door in an OFF state of the air conditioning control apparatus.

Description of Related Art

Various technology developments for carbon neutrality and cooperation between countries are taking place around the world. Accordingly, a sales volume of electrified vehicles such as hybrid electric vehicles (HEV), plug-in hybrid electric vehicles (PHEV), and electric vehicles is increasing.

An electrified vehicle provided with a battery utilizes an air-cooled or water-cooled battery cooling method, and it is used to decrease or increase a temperature of the battery by introducing an indoor temperature (cooling when it is hot, heating when it is cold).

In recently released vehicles, a full automatic temperature control (FATC) is in charge of air conditioning control.

In a conventional FATC, the indoor temperature is actively controlled to a target temperature in an ON state, and in an OFF state of the FATC, a position of a blend door in the ON state is maintained.

Accordingly, there is a problem that the blend door may be controlled only by temperature control in the ON state of the FATC. Furthermore, the blend door is set in a direction of Blend Door Only Heat or Cool only in a high or low state of the room temperature, and thus when the FATC is in the OFF state and in an outside air mode, a previous state of the blend door is fixed, so hot air or cold air different from a driver request may be introduced.

Furthermore, conventionally, for temperature control of the battery, when the battery is above or below a set temperature, the temperature of the battery is controlled by driving a cooling system or a heating system, it is not possible to preemptively respond to the temperature control of the battery.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air conditioning control apparatus and method for an electrified vehicle, configured for automatically controlling a blend door even when the air conditioning control apparatus is deactivated, by monitoring an environmental condition (e.g., temperature, weather, etc.) of a driving area and an indoor temperature.

An exemplary embodiment of the present disclosure has been made in an effort to provide an air conditioning control apparatus and method for an electrified vehicle, configured for preemptively responding to battery temperature control before a battery temperature reaches a high temperature at which a cooling system operates or a low temperature at which a heating system operates, by actively controlling a blend door and an internal vent door of a vehicle provided with an air-cooled replaceable battery.

The technical objects of the present disclosure are not limited to the objects mentioned above, and other technical objects not mentioned may be clearly understood by those skilled in the art from the description of the claims.

An exemplary embodiment of the present disclosure provides an air conditioning control apparatus for a vehicle, including: a processor configured to automatically switch to an outdoor mode when a replacement battery is mounted in a state in which the air conditioning control apparatus is deactivated and then to determine an operation mode of a blend door depending on an indoor temperature and a preset temperature in the vehicle; and a storage connected to the processor and configured to store data and algorithms driven by the processor.

In an exemplary embodiment of the present disclosure, the processor may be configured to determine the operation mode of the blend door depending on the indoor temperature and the preset temperature while the vehicle is driving.

In an exemplary embodiment of the present disclosure, the processor may be configured to determine the operation mode of the blend door depending on the indoor temperature and the preset temperature when the replaceable battery is driven by an air cooling system.

In an exemplary embodiment of the present disclosure, the processor, when the vehicle is not driving, the replaceable battery is not mounted, or the replaceable battery is driven by a water cooling system,
    may be configured to determine the operation mode of the blend door depending on the operation mode of the blend door last stored in the storage.

In an exemplary embodiment of the present disclosure, the processor may be configured to set the operation mode of the blend door to an only cool mode for cooling the indoor temperature when the indoor temperature is greater than the preset temperature.

In an exemplary embodiment of the present disclosure, the processor, when the indoor temperature is equal to or less than the preset temperature, may be configured to determine whether a temperature of a heating system is greater than the preset temperature.

In an exemplary embodiment of the present disclosure, the processor, when the temperature of the heating system is greater than the preset temperature, may be configured to set the operation mode of the blend door to an only hot mode for heating the indoor temperature.

In an exemplary embodiment of the present disclosure, the processor, when the temperature of the heating system is equal to or less than the preset temperature, may be configured to determine the operation mode of the blend door depending on the operation mode of the blend door last stored in the storage.

In an exemplary embodiment of the present disclosure, the processor, after the operation mode of the blend door is determined, may be configured to control a direction of a ventilation hole for outputting air to a vehicle interior based on at least one of the indoor temperature, an outdoor air temperature, the preset temperature, artificial intelligence learning data, a forced setting mode by a user, or any combination thereof.

In an exemplary embodiment of the present disclosure, the processor, when the operation mode of the blend door is an only cool mode for cooling the indoor temperature,
may be configured to compare the indoor temperature and the outdoor temperature, may be configured to control the direction of the ventilation hole depending on a position of a vent in the vehicle interior when the indoor temperature is greater than the outdoor air temperature.

In an exemplary embodiment of the present disclosure, the processor may be configured to control the direction of the ventilation hole to lower a battery temperature by facilitating cold wind outputted from the ventilation hole to move to the vent in the vehicle interior when the indoor temperature is greater than the outdoor air temperature.

In an exemplary embodiment of the present disclosure, the processor, when the operation mode of the blend door is an only cool mode for cooling the indoor temperature, when the indoor temperature is higher than the preset temperature, is configured to control the direction of the ventilation hole depending on direction information of the ventilation hole last stored in the storage.

In an exemplary embodiment of the present disclosure, the processor may be configured to control the direction of the ventilation hole based on the artificial intelligence learning data.

In an exemplary embodiment of the present disclosure, the processor, depending on the forced setting mode of the user, may be configured to control the direction of the ventilation hole toward a body of the user regardless of the indoor temperature.

In an exemplary embodiment of the present disclosure, the processor, when the operation mode of the blend door is an only hot mode for heating the indoor temperature, may be configured to compare the indoor temperature and the outdoor temperature, and may be configured to control the direction of the ventilation hole depending on a position of the vent in the vehicle interior when the indoor temperature is less than the outdoor air temperature.

In an exemplary embodiment of the present disclosure, the processor may be configured to control the direction of the ventilation hole to increase a battery temperature by sending hot wind from the ventilation hole to the position of the vent in the vehicle interior.

In an exemplary embodiment of the present disclosure, the processor, when the operation mode of the blend door is an only hot mode for heating the indoor temperature, when the indoor temperature is less than the preset temperature, may be configured to control the direction of the ventilation hole depending on direction information of the ventilation hole last stored in the storage.

In an exemplary embodiment of the present disclosure, the direction of the ventilation hole may include one or more of a head direction, a body direction, a floor direction, or any combination thereof.

In an exemplary embodiment of the present disclosure, the processor, after the operation mode of the blend door is determined, may be configured to receive priorities set by the user in advance for the indoor temperature, the outdoor air temperature, the preset temperature, the artificial intelligence learning data, and the forced setting mode by the user, and to control the direction of the ventilation hole depending on a highest priority.

An exemplary embodiment of the present disclosure provides an air conditioning control method for a vehicle, including: determining, by a processor, whether an air conditioning control apparatus is in a deactivated state and whether a replaceable battery is mounted; automatically switching, by the processor, to an outdoor mode when a replacement battery is mounted in a state in which the air conditioning control apparatus is deactivated; and determining, by the processor, an operation mode of a blend door depending on an indoor temperature and a preset temperature in the vehicle.

According to the present technique, it is possible to automatically control a blend door even when the air conditioning control apparatus is deactivated, by monitoring an environmental condition (e.g., temperature, weather, etc.) of a driving area and an indoor temperature.

According to the present technique, it is also possible to preemptively respond to battery temperature control before a battery temperature reaches a high temperature at which a cooling system operates or a low temperature at which a heating system operates, by actively controlling a blend door and an internal vent door of a vehicle provided with an air-cooled replaceable battery.

Furthermore, various effects which may be directly or indirectly identified through the present specification may be provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 illustrates an exemplary diagram of a position of a ventilation system by vehicle type according to an exemplary embodiment of the present disclosure.

Figure 1:
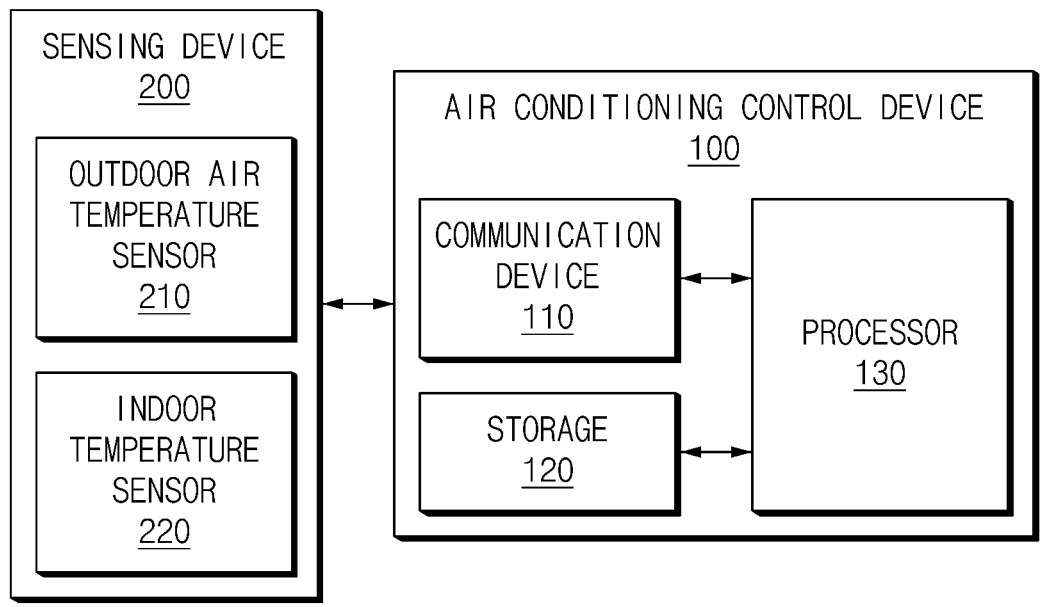
FIG. 1 illustrates a block diagram showing a configuration of an air conditioning control apparatus for a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to various exemplary embodiments of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field of the present disclosure to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 6.

FIG. 1 illustrates a block diagram showing a configuration of an air conditioning control apparatus of a vehicle according to an exemplary embodiment of the present disclosure.

An electric vehicle is driven using an electric motor that are driven by electrical energy charged in high-voltage batteries. Accordingly, the electric vehicle mainly utilizes a stationary battery which is fixed to the electric vehicle, but there is the inconvenience that electric vehicles cannot be driven during a charging time for charging the stationary battery and a waiting time at a charging station, and thus recently, batteries of electric vehicles are replaceable, and the present disclosure includes an air conditioning control apparatus applied to an electric vehicle provided with an air-cooled replaceable battery.

In the case of a vehicle provided with such an air-cooled replaceable battery, a vent for forming an air flow for cooling the battery is provided in a vehicle interior. In the instant case, the vent may be positioned under a rear seat, next to the rear seat, above the rear seat, in a direction of a headrest, etc. in a vehicle interior.

Accordingly, even when in an inactive state, the air conditioning control apparatus 100 with a replaceable battery may adjust a temperature of vehicle indoor air by changing a position of a blend door to generate a flow of indoor air, and may control an increase or a decrease in a temperature of the battery.

The air conditioning control apparatus 100 is configured to supply hot or cold air into a passenger compartment of the vehicle, and includes a housing and an evaporator core positioned therein, to adjust the temperature of the indoor air by supplying it into the passenger compartment through a vent (ventilation hole) facing a front window, a passenger's face, a floor, etc. after the air is cooled or heated as it passes through the evaporator core.

In the instant case, the air conditioning control apparatus 100 is configured to control the blend door to mix hot and cold air, and continuously moves the blend door to optimize the indoor temperature.

The air conditioning control apparatus 100 may be implemented as a full automatic temperature control (FATC), heating, ventilation, air conditioning (HVAC), or the like.

Furthermore, the vehicle in which the air conditioning control apparatus 100 of the present disclosure is mounted may include an electrified vehicle such as a hybrid electric vehicle (HEV), a plug-in hybrid electric vehicle (PHEV), an electric vehicle (EV), and the like.

The air conditioning control apparatus 100 according to the exemplary embodiment of the present disclosure may be implemented inside the vehicle. In the instant case, the air conditioning control apparatus 100 may be integrally formed with internal control units of the vehicle, or may be implemented as a separate device to be connected to control units of the vehicle by a separate connection means.

Referring to FIG. 1, the air conditioning control apparatus 100 may include a communication device 110, a storage 120, and a processor 130.

The communication device 110 is a hardware device implemented with various electronic circuits to transmit and receive signals through a wireless or wired connection, and may transmit and receive information based on in-vehicle devices and in-vehicle network communication techniques. As an exemplary embodiment of the present disclosure, the in-vehicle network communication techniques may include controller area network (CAN) communication, local interconnect network (LIN) communication, flex-ray communication, and the like.

For example, the communication device 110 may communicate with a driving device that drives a blend door to control the blend door, etc. In addition, the communication device 110 may communicate with a sensing device 200 to receive a detecting result of the sensing device 200 and transmit it to the processor 130.

The storage 120 may store data and/or algorithms required for the processor 130 to operate, and the detecting result of the sensing device 200.

As an exemplary embodiment of the present disclosure, the storage 120 may store information such as a set temperature. The set temperature may include an automatically set temperature of the air conditioning control apparatus 100, a manually set temperature by a user, and the like. In addition, the storage 120 may store a table in which index information for each condition for blend door control is matched. The detecting result of the sensing device 200 may include outdoor air temperature information and indoor temperature information. For example, the storage 120 stores a last state of the blend door and a last state of the ventilation hole. Herein, the last state indicates a state of being last set and used, and may include a position of the blend door, a direction of the ventilation hole, and the like.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may electrically control each component, and may be an electrical circuit that executes software commands, performing various data processing and determinations described below. The processor 130 may be implemented in a form of hardware, software, or a combination of hardware and software.

The processor 130 may process signals transferred between constituent elements of the air conditioning control apparatus 100. The processor 130 may be, e.g., an electronic control unit (ECU), a micro controller unit (MCU), a hybrid control unit (HCU), a vehicle control unit (VCU), or other sub controllers mounted in the vehicle.

When a replaceable battery is mounted in a state in which the air conditioning control apparatus is deactivated, the processor 130 may automatically switch to an outdoor air mode and then may determine an operation mode of the blend door depending on the indoor temperature and a preset temperature in the vehicle.

Furthermore, after the operation mode of the blend door is determined, the processor 130 may control the direction of the ventilation hole for outputting air to a vehicle interior based on at least one of the indoor temperature, the outdoor air temperature, the preset temperature, artificial intelligence learning data, a forced setting mode by a user, or any combination thereof.

The processor 130 may determine the operation mode of the blend door depending on the indoor temperature and the preset temperature while the vehicle is driving.

When a replaceable battery is driven by an air cooling system, the processor 130 may determine the operation mode of the blend door depending on the indoor temperature and the preset temperature.

The processor 130 may determine the operation mode of the blend door according to the operation mode of the blend door last stored in the storage when the vehicle is not driving, is not provided with a replaceable battery, or a replaceable battery is driven by a water cooling system.

When the indoor temperature is greater than the preset temperature, the processor 130 may set the operation mode of the blend door to an only cool mode for cooling the indoor temperature.

When the indoor temperature is below the preset temperature, the processor 130 may determine whether a temperature of a heating system (e.g., an engine, a positive temperature coefficient heater (PTC), etc.) is greater than the preset temperature.

When the temperature of the heating system is greater than the preset temperature, the processor 130 may set the operation mode of the blend door to an only hot mode for heating the indoor temperature.

When the temperature of the heating system is less than or equal to the preset temperature, the processor 130 may determine the operation mode of the blend door depending on the operation mode of the blend door last stored in the storage.

When the operation mode of the blend door is the only cool mode for cooling the indoor temperature, the processor 130 may compare the indoor temperature with the outdoor air temperature, and when the indoor temperature is greater than the outdoor air temperature, may control the direction of the ventilation hole depending on a position of the vent in the vehicle interior.

When the indoor temperature is greater than the outdoor air temperature, the processor 130 may control the direction of the ventilation hole to lower the battery temperature by facilitating cold wind outputted from the ventilation hole to move to the vent in the vehicle interior.

When the operation mode of the blend door is the only cool mode for cooling the indoor temperature, when the indoor temperature is higher than the preset temperature, the processor 130 may control the direction of the ventilation hole depending on direction information of the ventilation hole last stored in the storage.

The processor 130 may control the direction of the ventilation hole based on the artificial intelligence learning data. For example, based on the learning algorithm, when a user is a woman, the direction of the ventilation hole may be controlled to a floor direction instead of to a body direction thereof.

The processor 130 may control the direction of the ventilation hole toward a body of the user, regardless of the indoor temperature, depending on the forced setting mode of the user. That is, regardless of the indoor temperature, when the user sets the cool mode or the hot mode, air is output toward the body of the user to satisfy needs of the user.

When the operation mode of the blend door is the only hot mode for heating the indoor temperature, the processor 130 may compare the indoor temperature with the outdoor air temperature, and when the indoor temperature is smaller than the outdoor air temperature, may control the direction of the ventilation hole depending on the position of the vent in the vehicle interior.

The processor 130 may control the direction of the ventilation hole to increase a battery temperature by sending hot wind from the ventilation hole to the position of the vent in the vehicle interior.

When the operation mode of the blend door is the only hot mode for heating the indoor temperature, when the indoor temperature is lower than the preset temperature, the processor 130 may control the direction of the ventilation hole depending on direction information of the ventilation hole last stored in the storage. In the instant case, the direction of the ventilation hole may include at least one of a head direction, a body direction, a floor direction, or any combination thereof.

After the operation mode of the blend door is determined, the processor 130 may receive priorities set by the user in advance for the indoor temperature, the outdoor air temperature, the preset temperature, the artificial intelligence learning data, and the forced setting mode by the user, and may control the direction of the ventilation hole depending on a highest priority. In the instant case, priorities of conditions for controlling the direction of the ventilation hole may be preset by the user, but may also be set based on a learning algorithm based on artificial intelligence, surrounding environment data, etc.

Hereinafter, Table 1 shows conditions and indexes for detailed control of the ventilation hole for each operation mode of the blend door.

TABLE 1

| Blend door | Condition | Index | Ventilation hole control |
|---|---|---|---|
| Only cool mode | Indoor temperature > outdoor air temperature | 11 | Ventilation hole control depending on position of indoor duct |
| | Indoor temperature > set temperature | 12 | Ventilation hole control based on last memory |
| | Based on AI data | 13 | Indoor ventilation hole: head/body/floor direction AI active control |
| | User cold mode setting | 14 | Indoor ventilation hole: body direction |
| Only hot mode | Indoor temperature < outdoor air temperature | 21 | Ventilation hole control depending on position of indoor duct |
| | Indoor temperature < set temperature | 22 | Ventilation hole control based on last memory |
| | Based on AI data | 23 | Indoor ventilation hole: head/body/floor direction AI active control |
| | User hot mode setting | 24 | Indoor ventilation hole: body direction |

That is, when the operation mode of the blend door is the only cool mode, the processor 130 performs ventilation hole control for each index 11, 12, 13, and 14 depending on the indoor temperature, the outdoor air temperature, the set temperature, AI data, user cold mode setting, which is a user forced setting mode, etc.

In the instant case, ventilation hole control may be performed depending on a condition corresponding to the highest priority by setting the priority of each condition of the indexes 11, 12, 13, and 14 by the user in advance, or by determining the priority through monitoring. For example, when the user has set AI data-based vent control as the highest priority, the processor 130 may control the ventilation hole based on AI data.

When the indoor temperature is greater than the outdoor air temperature, it corresponds to the index 11, and is configured to control the direction of the ventilation hole depending on a position of an internal vent. For example, when the internal vent is positioned under a rear seat, the direction of the ventilation hole may be controlled to face a floor. Accordingly, air outputted through the ventilation hole may be transferred through the indoor vent (e.g., a cooling vent), to move to the battery through the indoor vent, controlling the battery temperature.

Furthermore, when the indoor temperature is greater than the set temperature, the position of the vent (e.g., a head direction, a body direction, or a floor direction) last stored in the storage 112 is maintained as the index 12.

When control is required based on the AI data, the air conditioning control apparatus 100 may control indoor vents of the vehicle to face one or each of the head direction, the body direction, and the floor direction depending on the AI data with the index 13. That is, the air conditioning control apparatus 100 may automatically controls the blend door even when the FATC is in an OFF state, by monitoring external environmental conditions (e.g., temperature, weather, etc.) during a driving cycle by use of artificial intelligence-based data, actively responding even to changes in regional temperature and weather.

Furthermore, when a user selects the cold mode regardless of the indoor temperature (e.g., in the case of a user who has a lot of heat), the air conditioning control apparatus 100 sets the direction of the ventilation hole to the body direction so that cold wind is directly outputted in the body direction of the user.

When the indoor temperature is lower than the outdoor air temperature, the position of the ventilation hole is controlled with an index 21 depending on the position of the indoor vent. Furthermore, when the indoor temperature is less than the set temperature, the position of the ventilation hole last stored in the storage 112 with an index 22 is used as it is. Furthermore, when control is required based on the AI data, the air conditioning control apparatus 100 may control indoor vents of the vehicle to face one or each of the head direction, the body direction, and the floor direction depending on the AI data with the index 13.

When a user selects the hot mode regardless of the indoor temperature (e.g., in the case of a user who has a lot of cold), the air conditioning control apparatus 100 sets the direction of the ventilation hole to the body direction so that hot wind is directly outputted in the body direction of the user.

The sensing device 200 may include an outdoor air temperature sensor 210 for detecting an outdoor air temperature outside the vehicle and an indoor temperature sensor 220 for detecting a temperature inside the vehicle.

Figure 2A:
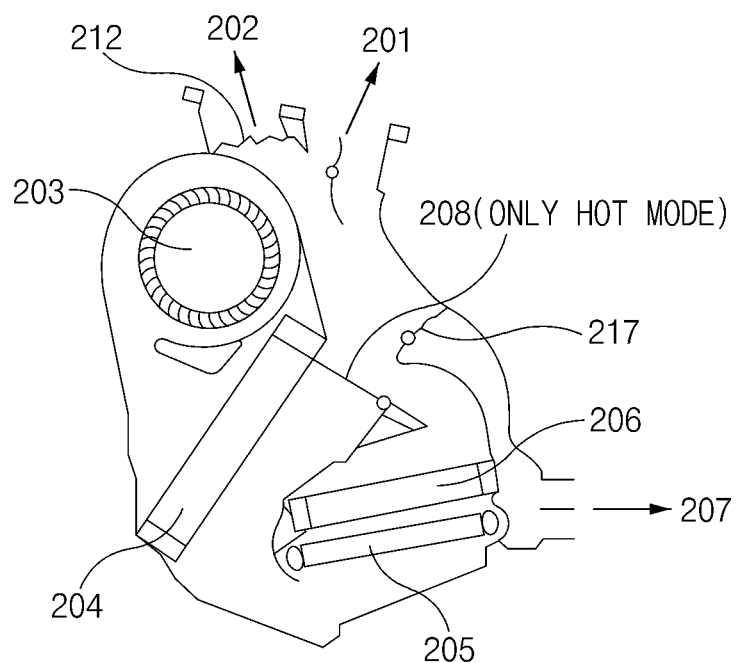
FIG. 2A and FIG. 2B each illustrate a view for describing a change in a position of a blend door in an internal structural diagram of an air conditioning control apparatus according to an exemplary embodiment of the present disclosure.
Figure 2B:
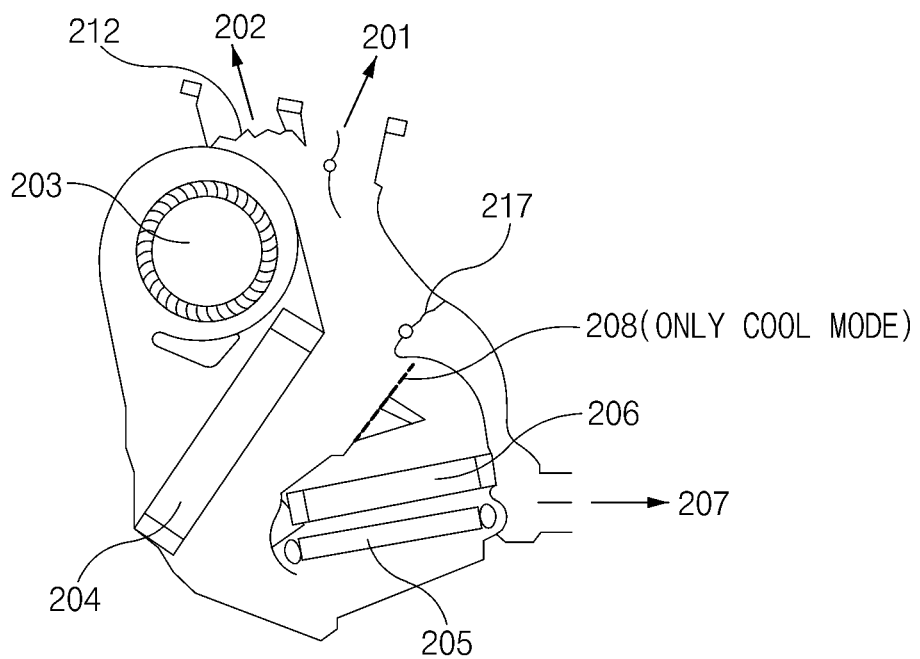

FIG. 2A and FIG. 2B each illustrate a change in a position of a blend door in an internal structural diagram of an air conditioning control apparatus according to an exemplary embodiment of the present disclosure, and FIG. 3 illustrates an exemplary diagram of a position of a ventilation system by vehicle type according to an exemplary embodiment of the present disclosure.

Referring to FIG. 2A and FIG. 2B, the air conditioning control apparatus 100 includes a vent 201, a defrost 202, a defrost door 212, a blower motor 203, an evaporator core 204, a condenser 205, a HV PTC 206, a rear floor 207, a rear floor door 217, and a blend door 208.

The vent 201 is a ventilation hole, and as illustrated in FIG. 3, a position of the ventilation hole is different for each vehicle type. A ventilation hole 301 may be positioned behind a headrest in a rear row of the vehicle, a ventilation hole 302 may be positioned next to a rear seat of the vehicle, and a ventilation hole 303 may be positioned under the rear seat of the vehicle. The defrost 202 is an outlet through which warm air is outputted to control moisture and frost clouding of the window glass. The rear floor 207 is an outlet through which air is outputted to a floor of the vehicle rear. Accordingly, the air conditioning control apparatus 100 outputs temperature-controlled air to the vent 201, the defrost 202, and the rear floor 207.

The blower motor, which is a blower motor, drives a blower fan that generates wind.

Air passes through the evaporator core 204 to cool or heat air.

The condenser 205 is a device for compressing refrigerant gas, and the HV PTC 206 warms air as a vehicle heater.

The defrost door 212 controls input and output of air in a direction of the defrost 202, the rear floor door 217 controls the input and output of air in a direction of the rear floor, and the blend door 208 controls the input and output of air in a direction of the vent 201.

The blend door 208 is a vacuum control device mounted in a carburetor air vent to mix heated air from a heat shroud and cold air for maintaining a temperature of a carburetor at a normal constant temperature.

As illustrated in FIG. 2A, in the only hot mode, the blend door 208 blocks cold air at a side of the evaporator core 204 and instead enables air heated by the HV PTC 206 to be outputted to the vent 201.

Conversely, in the only cool mode, the blend door 208 blocks the air heated by the HV PTC 206, and instead enables the cold air at the side of the evaporator core 204 to be outputted to the vent 201.

Figure 4:
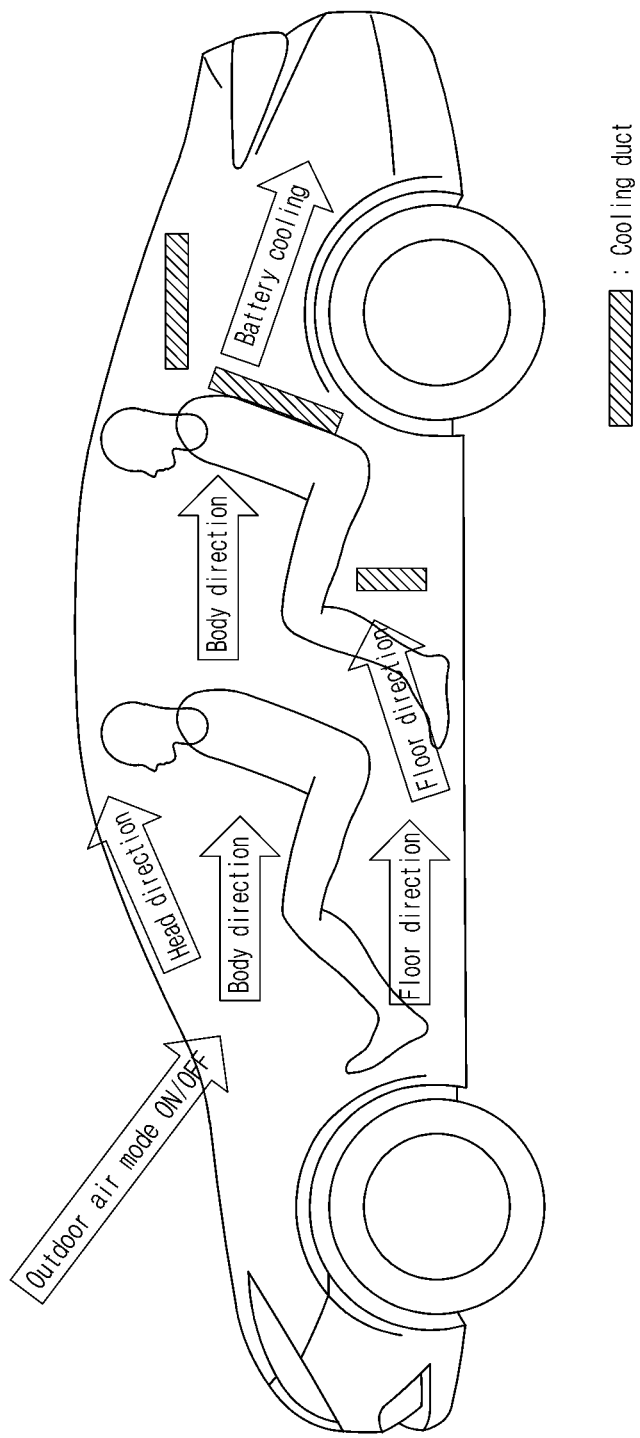
FIG. 4 illustrates an airflow in an electrified vehicle according to an exemplary embodiment of the present disclosure.

FIG. 4 illustrates an airflow in an electrified vehicle according to an exemplary embodiment of the present disclosure.

Referring to FIG. 4, outdoor air temperature may flow in driver head, body, and floor directions, and air inside the vehicle may move to the battery through cooling vents in a rear row of the vehicle to perform battery cooling. In the instant case, external air may be directed toward the cooling vents to cool the battery by controlling a ventilation direction of the vents.

Figure 5:
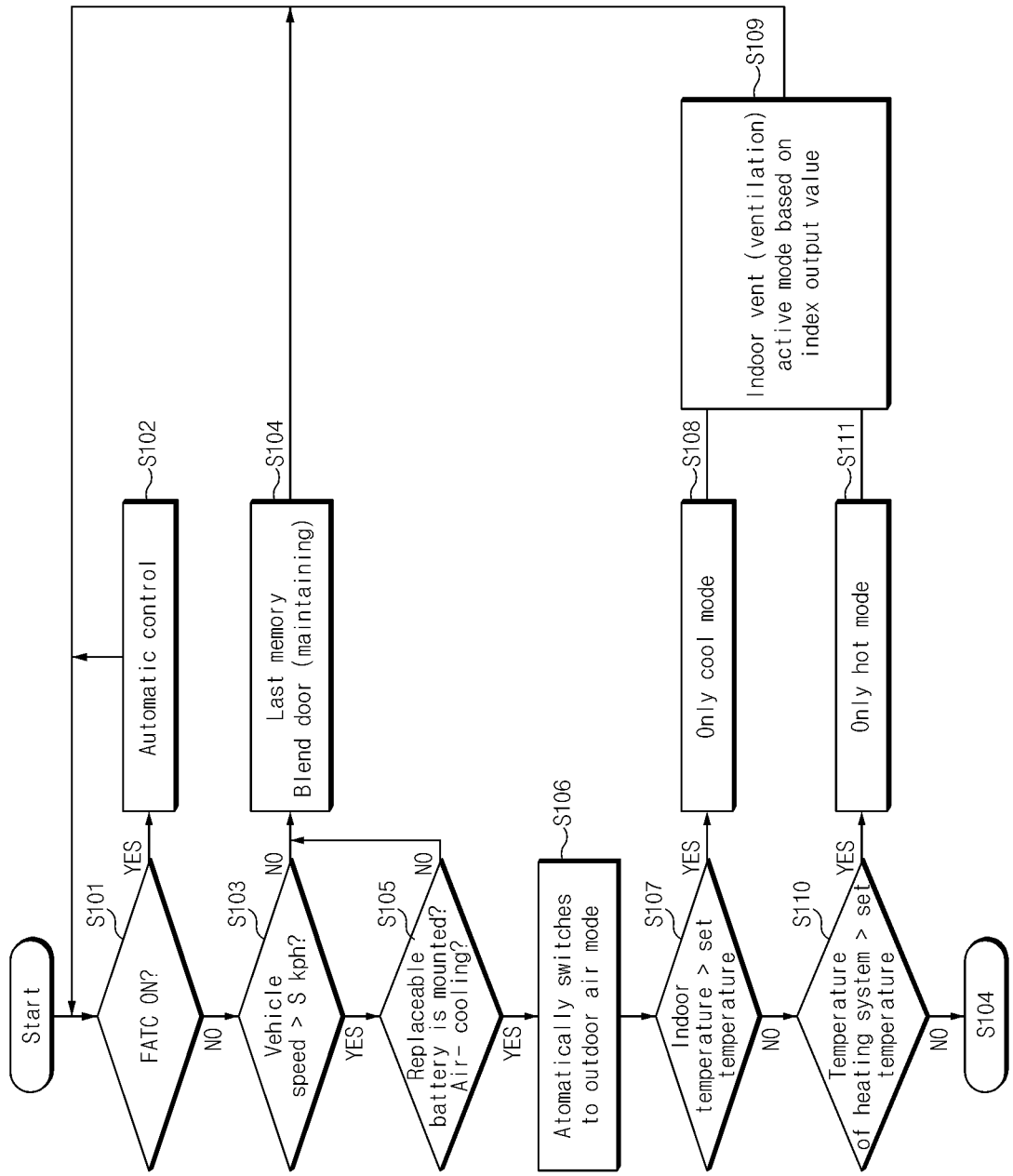
FIG. 5 illustrates a flowchart showing an air conditioning control method for a vehicle according to an exemplary embodiment of the present disclosure.

Hereinafter, an air conditioning control method for a vehicle according to an exemplary embodiment of the present disclosure will be described in detail with reference to FIG. 5. FIG. 5 illustrates a flowchart showing an air conditioning control method for a vehicle according to an exemplary embodiment of the present disclosure.

Hereinafter, it is assumed that the air conditioning control apparatus 100 of the of FIG. 1 performs processes of FIG. 5. Furthermore, in the description of FIG. 5, operations referred to as being performed by a device may be understood as being controlled by the processor 130 of the air conditioning control apparatus 100.

Referring to FIG. 5, the air conditioning control apparatus 100 determines whether the air conditioning control device 100 (e.g., FATC) is in an activated state (ON) (S101).

When the air conditioning control apparatus 100 is activated, the air conditioning control apparatus 100 automatically controls an indoor temperature to follow a set temperature based on an outdoor air temperature and the indoor temperature (S102).

When the air conditioning control apparatus 100 is not in the activated state, the air conditioning control apparatus 100 determines whether a vehicle speed is greater than a predetermined reference value (S kph) (S103). That is, the air conditioning control apparatus 100 determines whether the vehicle is currently driving.

When the vehicle speed is less than the predetermined reference value, that is, when the vehicle is in a stopped state, the air conditioning control apparatus 100 maintains a state of the blend door 208 last stored in the storage 120 (memory) (S104). In the instant case, the state of the blend door 208 may be in the only hot mode as illustrated in FIG. 2A or in the only cool mode as illustrated in FIG. 2B.

When the vehicle speed is greater than the predetermined reference value, that is, when it is determined that the vehicle is driving, the air conditioning control apparatus 100 determines whether a replaceable battery is mounted (S105). In the instant case, the air conditioning control apparatus 100 may determine whether a replaceable battery is mounted and whether the replaceable battery is air-cooled or water-cooled by use of battery information. That is, the battery information may include information related to whether it is a replaceable battery, and whether the replaceable battery is an air-cooled battery or a water-cooled battery.

When the replaceable battery is not mounted, or when the replaceable battery is water-cooled, the air conditioning control apparatus 100 maintains the state of the blend door 208 last stored in the storage 112 (S104).

On the other hand, when the replaceable battery is mounted and the replaceable battery is air-cooled, the air conditioning control apparatus 100 automatically switches to the outdoor air mode (S106). In the instant case, an outdoor air mode is one of the modes for controlling air conditioning, and is a mode for introducing external air into the vehicle interior.

Next, the air conditioning control apparatus 100 compares the indoor temperature with the set temperature (S107). In the instant case, the indoor temperature may be a current indoor temperature of the vehicle, and the set temperature may include a usual FATC AUTO user set temperature or a user manual set temperature for OFF cycle credit smart control.

When the indoor temperature is higher than the set temperature, the air conditioning control apparatus 100 is configured to control the blend door in the only cool mode (S108), and performs indoor vent control for each blend index as shown in Table 1 (S109).

That is, when the indoor temperature is greater than the outdoor air temperature, it corresponds to the index 11, and controls the direction of the ventilation hole depending on a position of an internal vent. For example, when the internal vent is positioned under a rear seat, the direction of the ventilation hole may be controlled to face a floor. Furthermore, when the indoor temperature is greater than the set temperature, the position of the vent (e.g., a head direction, a body direction, or a floor direction) last stored in the storage 112 is maintained as the index 12.

When control is required based on the AI data, the air conditioning control apparatus 100 may control indoor vents of the vehicle to face one or each of the head direction, the body direction, and the floor direction depending on the AI data with the index 13. That is, the air conditioning control apparatus 100 may automatically controls the blend door even when the FATC is in an OFF state, by monitoring external environmental conditions (e.g., temperature, weather, etc.) during a driving cycle by use of artificial intelligence-based data, actively responding even to changes in regional temperature and weather.

Furthermore, when a user selects the cold mode regardless of the indoor temperature (e.g., in the case of a user who has a lot of heat), the air conditioning control apparatus 100 sets the direction of the ventilation hole to the body direction so that cold wind is directly outputted in the body direction of the user.

On the other hand, when the indoor temperature is not higher than the set temperature, the air conditioning control apparatus 100 determines whether a temperature of a heating system (an engine, a PTC heater, etc.) is higher than the set temperature (S110), and when the temperature of the heating system is higher than the set temperature, drives the blend door in the on-hot mode (S111). That is, when an engine coolant temperature, a PTC temperature of an EV, etc. are higher than the set temperature, the blend door may be driven in the only hot mode. However, when the engine coolant temperature, the PTC temperature of an EV, etc. are equal to or less than the set temperature, the air conditioning control apparatus 100 maintains the state of the blend door last stored in the storage 112.

Accordingly, as shown in Table 1, the air conditioning control apparatus 100 performs indoor vent control such hot air for each blend index is outputted into the vehicle through the vent 201 (S109).

That is, when the indoor temperature is lower than the outdoor air temperature, the air conditioning control apparatus 100 is configured to control the position of the ventilation hole with the index 21 depending on the position of the indoor vent. Furthermore, when the indoor temperature is less than the set temperature, the position of the ventilation hole last stored in the storage 112 with an index 22 is used as it is. Furthermore, when control is required based on the AI data, the vehicle air conditioning control apparatus 100 may control indoor vents of the vehicle to face one or each of the head direction, the body direction, and the floor direction depending on the AI data with the index 13.

When a user selects the hot mode regardless of the indoor temperature (e.g., in the case of a user who has a lot of cold), the air conditioning control apparatus 100 sets the direction of the ventilation hole to the body direction so that hot wind is directly outputted in the body direction of the user.

For example, when the set temperature is 21 degrees and the indoor temperature is degrees, the blend door is driven in the only cool mode, and when the set temperature is degrees and the indoor temperature is 21 degrees, the blend door may be driven in the only hot mode, and by determining whether the temperature of the heating system (an engine, a PTC heater, etc.) is higher than the set temperature, when the temperature of the heating system is higher than the set temperature, the blend door is driven in the only hot mode. That is, when an engine coolant temperature, a PTC temperature of an EV, etc. are higher than the set temperature, the blend door may be driven in the only hot mode.

Accordingly, according to an exemplary embodiment of the present disclosure, energy may be saved by optimizing the indoor temperature in the vehicle by automatically controlling the directions of the blend door and vents even when the air conditioning control apparatus is off, that is, when no power is used.

Furthermore, according to an exemplary embodiment of the present disclosure, it is possible to optimize the indoor temperature in the vehicle with the replaceable battery, and it is possible to optimize a battery temperature in advance by preemptively sending indoor air to a cooling vent to cool or heat the battery temperature before the battery temperature reaches a reference temperature for driving a cooling system or the reference temperature for driving a heating system, significantly improving vehicle marketability.

Figure 6:
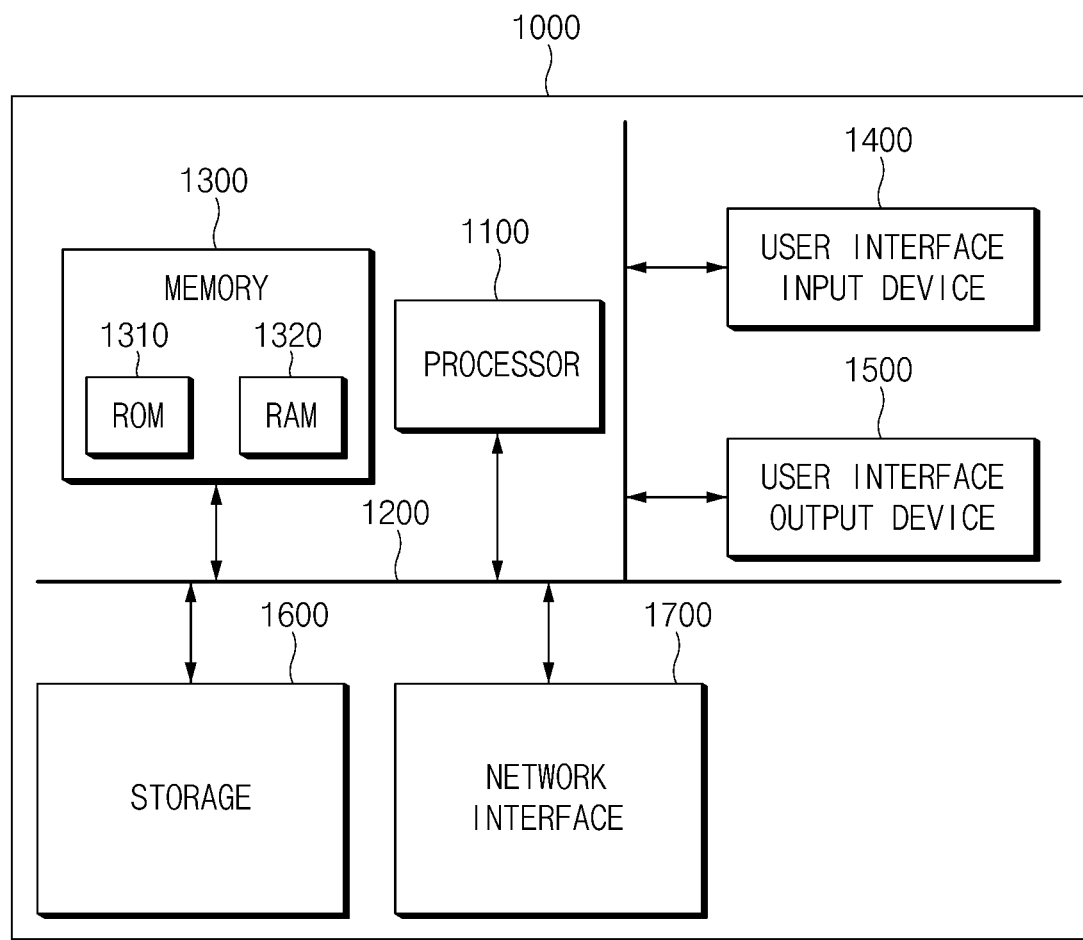
FIG. 6 illustrates a computing system according to an exemplary embodiment of the present disclosure.

FIG. 6 illustrates a computing system according to an exemplary embodiment of the present disclosure.

Referring to FIG. 6, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air conditioning control apparatus for a vehicle, the air conditioning control apparatus comprising:
a processor configured to automatically switch to an outdoor air mode when a replaceable battery with air cooling is mounted and in a state in which the air conditioning control apparatus is deactivated, and then to determine an operation mode of a blend door depending on an indoor temperature and a preset temperature in the vehicle; and
a storage connected to the processor and configured to store data and algorithms driven by the processor, wherein the processor is further configured to set the operation mode of the blend door to an only cool mode for cooling the indoor temperature based on that the indoor temperature is greater than the preset temperature, so that a replaceable battery temperature control is preemptively responded to before a battery temperature reaches a first set temperature at which a cooling system for battery cooling operates or before the battery temperature reaches the first set temperature at which a cooling system for battery cooling operates or a second set temperature at which a heating system operates, and to perform cooling control based on a speed of the vehicle, when in a state in which the air conditioning control apparatus is deactivated.

2. The air conditioning control apparatus of claim 1, wherein the processor is configured to determine the operation mode of the blend door depending on the indoor temperature and the preset temperature while the vehicle is driving.

3. The air conditioning control apparatus of claim 2, wherein the processor is configured to determine the operation mode of the blend door depending on the indoor temperature and the preset temperature when the replaceable battery is driven by an air cooling system.

4. The air conditioning control apparatus of claim 3, wherein when the vehicle is not driving, the replaceable battery is not mounted, or the replaceable battery is driven by a water cooling system, the processor is configured to determine the operation mode of the blend door depending on the operation mode of the blend door last stored in the storage.

5. An air conditioning control method for a vehicle, the air conditioning control method comprising:
    determining, by a processor, whether an air conditioning control apparatus is in a deactivated state and whether a replaceable battery with air cooling is mounted;
    automatically switching, by the processor, to an outdoor mode when the replaceable battery is mounted in a state in which the air conditioning control apparatus is deactivated; and
    determining, by the processor, an operation mode of a blend door depending on an indoor temperature and a preset temperature in the vehicle,
    wherein the determining, by the processor, the operation mode of the blend door comprises setting the operation mode of the blend door to an only cool mode for cooling the indoor temperature based on that the indoor temperature is greater than the preset temperature, so that a replaceable battery temperature control is pre-emptively responded to before a battery temperature reaches a first set temperature at which a cooling system for battery cooling operates or before the battery temperature reaches the first set temperature at which a cooling system for battery cooling operates or a second set temperature at which a heating system operates; and
    performing cooling control based on a speed of the vehicle, when in a state in which the air conditioning control apparatus is deactivated.

6. The air conditioning control apparatus of claim 1, wherein when the indoor temperature is equal to or less than the preset temperature, the processor is configured to determine whether a temperature of the heating system is greater than the preset temperature.

7. The air conditioning control apparatus of claim 6, wherein when the temperature of the heating system is greater than the preset temperature, the processor is configured to set the operation mode of the blend door to an only hot mode for heating the indoor temperature.

8. The air conditioning control apparatus of claim 6, wherein when the temperature of the heating system is equal to or less than the preset temperature, the processor is configured to determine the operation mode of the blend door depending on the operation mode of the blend door last stored in the storage.

9. The air conditioning control apparatus of claim 1, wherein after the operation mode of the blend door is determined, the processor is configured to control a direction of a ventilation hole for outputting air to a vehicle interior based on at least one of the indoor temperature, an outdoor air temperature, the preset temperature, artificial intelligence learning data, a forced setting mode by a user, or any combination thereof.

10. The air conditioning control apparatus of claim 9, wherein the processor,
    when the operation mode of the blend door is the only cool mode for cooling the indoor temperature,
    is configured to compare the indoor temperature and the outdoor air temperature, and
    is configured to control the direction of the ventilation hole depending on a position of a vent in the vehicle interior when the indoor temperature is greater than the outdoor air temperature.

11. The air conditioning control apparatus of claim 10, wherein the processor is configured to control the direction of the ventilation hole to lower the battery temperature by enabling cold wind outputted from the ventilation hole to move to the vent in the vehicle interior when the indoor temperature is greater than the outdoor air temperature.

12. The air conditioning control apparatus of claim 9, wherein
    when the operation mode of the blend door is the only cool mode for cooling the indoor temperature, and
    when the indoor temperature is higher than the preset temperature,
    the processor is configured to control the direction of the ventilation hole depending on direction information of the ventilation hole last stored in the storage.

13. The air conditioning control apparatus of claim 9, wherein the processor is configured to control the direction of the ventilation hole based on the artificial intelligence learning data.

14. The air conditioning control apparatus of claim 9, wherein the processor, depending on the forced setting mode of the user, is configured to control the direction of the ventilation hole toward a body of the user regardless of the indoor temperature.

15. The air conditioning control apparatus of claim 9, wherein the processor,
    when the operation mode of the blend door is an only hot mode for heating the indoor temperature,
    is configured to compare the indoor temperature and the outdoor air temperature, and
    is configured to control the direction of the ventilation hole depending on a position of a vent in the vehicle interior when the indoor temperature is less than the outdoor air temperature.

16. The air conditioning control apparatus of claim 15, wherein the processor is configured to control the direction of the ventilation hole to increase the battery temperature by sending hot wind from the ventilation hole to the position of the vent in the vehicle interior.

17. The air conditioning control apparatus of claim 9, wherein
    when the operation mode of the blend door is an only hot mode for heating the indoor temperature, and
    when the indoor temperature is less than the preset temperature,
    the processor is configured to control the direction of the ventilation hole depending on direction information of the ventilation hole last stored in the storage.

18. The air conditioning control apparatus of claim 9, wherein the direction of the ventilation hole includes at least one of a head direction, a body direction, a floor direction, or any combination thereof.

19. The air conditioning control apparatus of claim 9, wherein the processor, after the operation mode of the blend door is determined, is configured to receive priorities set by the user in advance for the indoor temperature, the outdoor air temperature, the preset temperature, the artificial intelligence learning data, and the forced setting mode by the user, and to control the direction of the ventilation hole depending on a highest priority.

* * * * *